United States Patent [19]

Isberg

[11] Patent Number: 4,972,505
[45] Date of Patent: Nov. 20, 1990

[54] TUNNEL DISTRIBUTED CABLE ANTENNA SYSTEM WITH SIGNAL TOP COUPLING APPROXIMATELY SAME RADIATED ENERGY

[76] Inventor: Reuben A. Isberg, 1215 Henry St., Berkeley, Calif. 94709

[21] Appl. No.: 280,488

[22] Filed: Dec. 6, 1988

[51] Int. Cl.$^5$ .................. H04H 1/00; H04N 7/10
[52] U.S. Cl. .......................... 455/3; 455/7; 455/15; 455/55; 333/24 C; 333/136; 358/86; 439/394
[58] Field of Search .................. 455/3, 5, 6, 7, 25, 455/295, 14, 16, 15, 55; 358/84, 86; 333/136, 127, 128, 115, 24 R, 24 C; 439/394, 578

[56] References Cited

U.S. PATENT DOCUMENTS

| | | | |
|---|---|---|---|
| 2,267,539 | 12/1941 | Thorne | 333/24 C |
| 2,677,108 | 4/1954 | Brady | 333/136 |
| 2,694,182 | 11/1954 | Edlen et al. | 333/136 |
| 3,364,489 | 1/1968 | Masters | 333/24 C |
| 3,781,687 | 12/1973 | Nakahara et al. | 455/55 |
| 3,836,943 | 9/1974 | Horak | 439/394 |
| 3,916,311 | 10/1975 | Davis et al. | |
| 4,034,289 | 7/1977 | Rozylowicz et al. | 333/115 |
| 4,358,764 | 11/1982 | Cheal et al. | 333/127 |
| 4,637,064 | 1/1987 | Roberts et al. | 455/49 |

FOREIGN PATENT DOCUMENTS

1239231  7/1971  United Kingdom .................. 455/55

OTHER PUBLICATIONS

N. Monk and H. S. Winbigler, "Communication with Moving Trains in Tunnels," Institute of Radio Engineers (IRE) Transactions on Vehicular Communications, Dec. 1956, pp. 21–28.
R. A. Farmer, N. H. Shephard, "Guided Radiation . . . the Key to Tunnel Talking", Institute of Electrical and Electronic Engineers (IEEE) Transactions on Vehicular Communications, Mar., 1965, pp. 93–102.
D. J. R. Martin, "Leaky-Feeder Radio Communication: A Historial Review," circa 1982.
R. A. Isberg, "A Review of Applications of Guided Ratio Communications Technology," IEEE 31st Vehicular Technology Conference Record, Apr. 1981, pp. 110–119.
R. A. Isberg, J. C. Cawley and R. L. Chufo, "The Design and Implementation of a UHF Radio System Using Distributed Antennas, Passive Reflectors . . . Pillar Limestone Mine," IEEE 32nd Vehicular Technology Conference Record, May, 1982.
R. A. Isberg and D. Turrell, "Applying CATV Technology and Equipment in Guided Radio Systems," IEEE 34th Vehicular Technology Conference Record, May, 1984.
R. A. Isberg, R. Trottier and B. Hicks, "A Guided Radio System Using CATV Amplifiers and Pressure Taps on CATV Cable to Feed Distributed Antennas," IEEE 35th Vehicular Technology Conference Record, May, 1985.

*Primary Examiner*—Reinhard J. Eisenzopf
*Assistant Examiner*—Lisa D. Charonel

[57] ABSTRACT

A distributed radio antenna system for extending radio communications into confined regions into which external radio signals do not penetrate, the system having separate transmitting (TX) and receiving (Rx) antenna systems. Each Tx or Rx system has an elongated low loss coaxial cable system (18 or 31) and a plurality of antennas (23 or 28) connected to each of the individual segments of the cable system at spaced distances along the length of the cable segment. The antennas are coupled to the cable segments by signal taps (21 or 21') having adjustable or preselected values of attenuation so that the power fed to each TX antenna (23) from the Tx cable system (18) is approximately the same and so that the attenuation of the signals received from each Rx antenna (28) is approximately the same, thereby conserving power and reducing system cost. The Rx antennas (28) are located generally intermediate to the Tx antennas (23) so that spurious and intermodulation signals are substantially diminished by space attenuation.

13 Claims, 3 Drawing Sheets

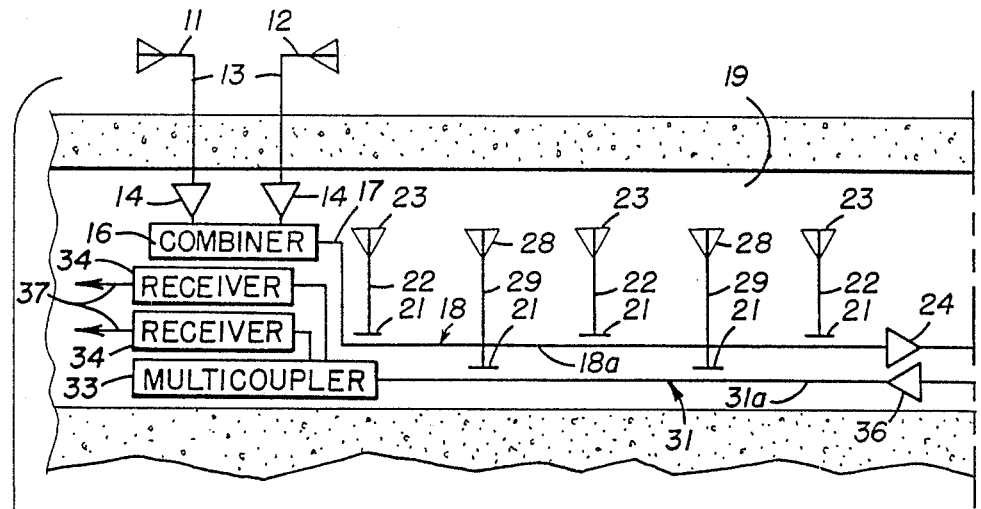
FIGURE 1
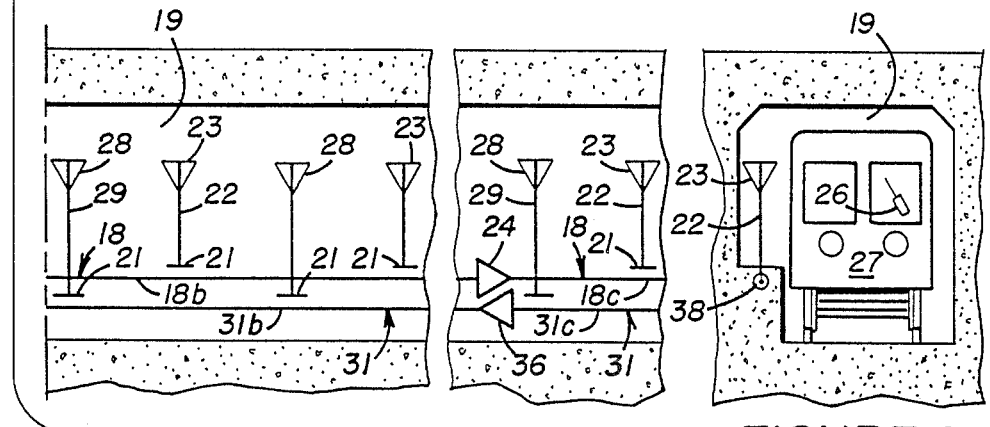
FIGURE 2
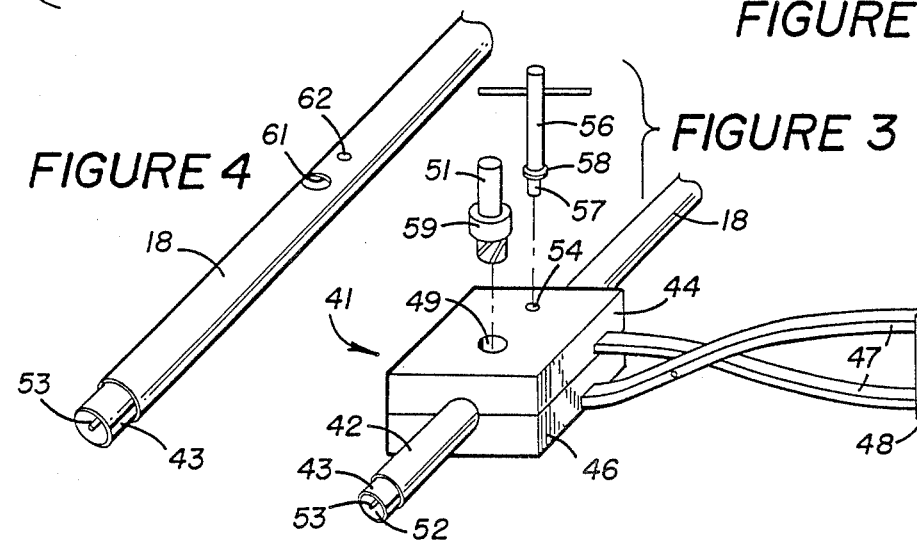
FIGURE 3
FIGURE 4

TUNNEL DISTRIBUTED CABLE ANTENNA SYSTEM WITH SIGNAL TOP COUPLING APPROXIMATELY SAME RADIATED ENERGY

FIELD OF INVENTION

This invention relates to guided radio frequency systems for extending radio communications into confined regions into which external radio signals do not penetrate, such as subways, tunnels, mines, building interiors, ship interiors, and so forth.

BACKGROUND OF THE INVENTION

The problems of propagating radio signals into underground regions have been evident since the earliest days of radio communication. For example, it was soon found, for the frequencies used, that the radio signals did not penetrate into tunnels beyond a few hundred feet. Thus, communication with trains when they were within tunnels of any substantial length was not possible with the then existing radio systems.

One of the first successful tunnel communications systems is that described in N. Monk and H. S. Winbigler, "Communication with Moving Trains in Tunnels," *IRE Trans. Vehic. Comm.*, Vol. VC-7, Dec. 1956, pp. 21-28, in which the leakage fields of the standard coaxial cable running through a railroad tunnel were found to be adequate to provide communication between a fixed base station connected to one end of the cable and a radio receiver on a train passing through the tunnel.

The "leaky feeder" principle, using the leakage from an open-braided type of coaxial cable has been used in numerous subsequent installations. Another type of cable, in widespread use, utilized a corrugated-outer type of cable but with discrete holes or slots milled in an otherwise solid shield to provide the necessary radio frequency leakage.

Although successful in use, the leaky-feeder coaxial cables have several disadvantages. The cables are often quite stiff, and should be spaced away from metal or concrete surfaces, requiring attachments spaced approximately five feet apart along the length of the cable. The consequent cost of installation is quite high because of the large amount of labor required.

In subways or other tunnels, the leaky coaxial cable is usually mounted high on the tunnel wall, where it is vulnerable to melting in the event of a fire, or to damage in case of derailment.

In addition, the input power into the cable must be relatively great in order to provide sufficient effective radiated power for communication. The radiated power decreases significantly along the length of the cable, requiring numerous radio frequency amplifiers along the length of the cable to maintain the signal power in the cable at a high enough level for effective communication.

In 1981, a distributed antenna system was developed to overcome some of the disadvantages of the leaky-feeder systems. The system, described in R. A. Isberg, J. C. Cawley and R. L. Chufo, "The Design and Implementation of a VHF Radio System Using Distributed Antennas, Passive Reflectors and Two-Way Signal Boosters in a Room and Pillar Limestone Mine," *IEFE 32nd Vehicular Technology Conference Record*, May 1982, used a 1200 foot long coaxial cable which fed, through 2 to 1 power dividers, four whip antennas spaced along the length of the cable. The cost of installation was significantly less than a leaky coaxial cable installation would have been, and it was found that the distributed antenna system had a substantially greater operating range for the same amount of input power than would have been required for a leaky coaxial cable system. For the 1200 foot cable system, with four antennas, the effective radiated power from the various antennas ranged from 17 watts for the antenna nearest to the base station end of the cable to 0.05 watts for the antenna farthest from the base station. The signals from transceivers received at the most distant antennas were attenuated approximately 21 dB by losses in the cable and power dividers.

A subsequent distributed antenna system, described in R. A. Isberg and D. Turrell, "Applying CATV Technology and Equipment in Guided Radio Systems," *IEEE 34th Vehicular Technology Conference Record*, May, 1984, used two coaxial cables, one for transmission and the other for reception, extending through tunnels, with UHF antennas connected to each cable and spaced 75 to 100 meters apart along the cables. The transmitting antennas were located closely adjacent the receiving antennas, and the antennas were connected to the cables by two-way power splitters each with a 4 dB loss. CATV amplifiers were used at intervals along the length of the cables to maintain the signal power in the cables at an effective level, with one or two antennas being coupled to the cables between successive amplifiers.

A more recent distributed antenna system is described in R. A. Isberg, R. Trottier and B. Hicks, "A Guided Radio System Using CATV Amplifiers and Pressure Taps on CATV Amplifiers and Pressure Taps on CATV Cable to Feed Distributed Antennas," *IEEE 35th Vehicular Technology Conference Record*, May, 1985, wherein, for example, a single 420 foot long CATV coaxial cable was extended through a ship's alleyway, with UHF one quarter wave length mobile whip antennas being connected to the cable at 50 foot intervals by standard CATV 12 dB isolation pressure taps. Such a tap has a pointed center conductor which extends through a hole in the braided shield of the cable to contact the center conductor of the cable. A type F receptacle on the tap is coupled to the center conductor through a small capacitor A ferrite transformer and resistor in the tap couple the radio frequency signal from the cable to the antenna or vice versa.

Although the distributed antenna systems that have been installed overcome some of the disadvantages of the leaky cable systems, they have the same disadvantage in that the power to the various antennas along the length of the cable decreases substantially from the end of the cables to which the radio signal is applied. Likewise, the total attenuation of a signal received at an antenna farthest from the radio receiver end of the cable will be much greater than that of a signal received from the antenna nearest the radio receiver and of the cable. As a consequence a considerable number of signal booster amplifiers are required to maintain the effective radiated power at a sufficient level at all antennas, and to overcome the different total attenuation of signals received by the different antennas from transceivers in communication with the system. This problems is exacerbated in situations wherein governmental regulations restrict the amount of radiated power from the transmitting system or the transceivers to a low level. For example, the FCC Rules and Regulations applicable to shipboard installations limit the transmitter output power to four watts, and the effective radiated power to two watts for on-board communication on 457.525, 457.550, 457.575 and 457.600 mHz channels.

It has also been found in the prior distributed antenna systems that interfering spurious or intermodulation signals generated by the transmitter or signal booster amplifiers will be present at the radio receiver along with the signals from the transceiver, and it has been difficult and expensive to attenuate those interfering signals.

SUMMARY OF THE INVENTION

It is a primary object of the invention to provide a distributed antenna system, which will provide a more uniform distribution of power to transmitting antennas spaced along a coaxial cable and which will provide a more uniform total attenuation of signals received by receiving antennas spaced along a coaxial cable.

It is a further object of the invention to provide a distributed antenna system which will provide for attenuation of spurious or intermodulation interfering signals generated by the transmitter and/or signal booster amplifiers.

Additional objects, advantages and novel features of the invention will be set forth in the description which follows, and, in part, will become apparent to those skilled in the art upon examination of the following, or may be learned by practice of the invention. The objects and advantages of the invention may be realized and attained by means of the instrumentalities and combinations pointed out in the appended claims.

To achieve the foregoing and other objects, and in accordance with the invention as described and broadly claimed herein, an improved distributed antenna system is provided having first and second elongated low loss coaxial cable segments, a plurality of transmitting antennas proximate to the first cable segment at spaced intervals therealong, a plurality of signal taps coupling the transmitting antennas to the first cable segment so that a preselected amount of radio frequency power is coupled from the cable segment to each transmitting antenna in order that the power to each antenna is approximately the same, a plurality of receiving antennas proximate the second cable segment, and a plurality of taps coupling the receiving antennas to the second cable segment so that a preselected amount of radio frequency power is coupled from each antenna to the second cable segment so that the total attenuation o signals received by each receiving antenna to one end of the second cable segment is approximately the same.

In further accordance with the invention, the transmitting and receiving antennas are spaced in staggered relation to each other to provide for substantial space attenuation of spurious or intermodulation signals transmitted by the transmitting antennas.

BRIEF DESCRIPTION OF THE DRAWINGS

The accompanying drawings which are incorporated in and form a part of this application, together with the description, serve to explain the principles of the invention.

FIG. 1 is a diagrammatic cross-section of a subway tunnel and a block diagram of a distributed antenna system in accordance with the present invention which is installed in the subway.

FIG. 2 is a cross-section of the system of FIG. 1, showing a train in the subway.

FIG. 3 is a perspective view of a tool for drilling holes in a coaxial cable to enable signal taps constructed in accordance with the present invention to be connected to the cable.

FIG. 4 is a perspective view of a coaxial cable having holes therein produced by the tool of FIG. 3.

DESCRIPTION OF THE PREFERRED EMBODIMENTS

Figure 5:
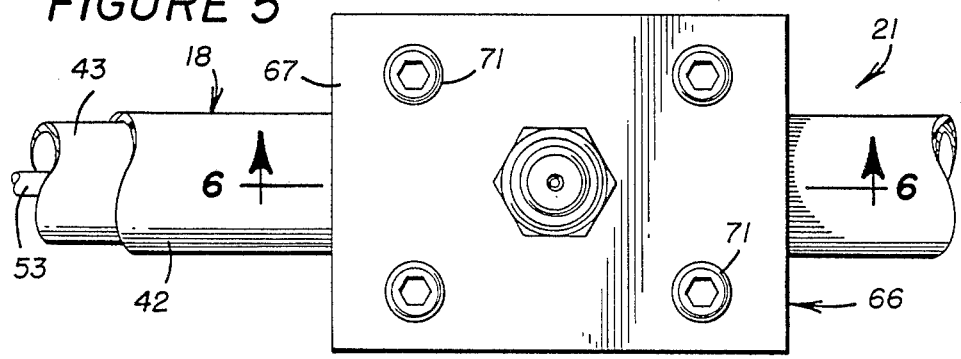
FIG. 5 is a top view of a signal tap constructed in accordance with the present invention.

Referring now to the drawings, and in particular to FIGS. 1 and 2, radio signals from base stations (not shown) above ground are received by antennas 11 and 12 and carried by transmission lines 13 to frequency selective radio frequency amplifiers 14 which select and amplify the desired signals. The outputs of the amplifiers are combined in the combiner 16 and fed by transmission line 17 to the transmitting (Tx) coaxial cable system 18, which extends through the subway tunnel 19. Signal taps 21 are attached to the Tx cable system 18 approximately every 200 feet (or as needed), and short transmission lines 22 connect the outputs of the taps 21 to the transmitting antennas 23 that are mounted on the wall of the subway. Depending on the total length needed, the Tx cable system 18 may comprise a plurality of individual cable segments 18a, 18b, 18c, and so forth, each segment being for example of 1,200 feet in length, with signal boosters 24 being installed between successive cable segments to compensate for the attenuation of the signals in the Tx cable. Each cable segment may have Tx antennas 23 connected thereto by taps 21 approximately every 200 feet, or as needed.

Signals transmitted by the Tx antennas are received by transceivers 26 or other mobile radio equipment in subway trains 27. Radio signals transmitted from the subway trains are received by receiving (Rx) antennas 28, and those signals are passed through transmission lines 29 to signal taps 21 attached to the Rx coaxial cable system 31. The Rx cable system carries the Rx signal to the receiving antenna multicoupler 33 which feeds radio receivers 34 that are tuned to each desired channel. As shown in FIG. 1, the Rx cable system 31 may comprise a plurality of individual cable segments 31a, 31b, 31c, and so forth, of a number and length corresponding to the Tx cable segments 18a, at seq., with signal boosters 36 installed between successive Rx cable segments to compensate for the attenuation of the signal in the Rx cable segments. The Rx antennas 28 are connected to the Rx cable segments with approximately the same spacing between Rx antennas as the spacing between the Tx antennas, e.g. approximately 200 feet or as needed. The audio outputs of the receivers 34 are carried by telephone lines 36 to the designated transit, police, fire, ambulance, etc. control centers. An alternative to sending the audio over telephone lines would be to use on-frequency repeaters or selective radio frequency amplifiers (not shown) to feed the Rx radio frequency signals to external antennas directed toward the control centers.

As is brought out more fully below, the signal taps 21 can each extract a preselected amount of radio frequency energy from the Tx cable system 18 and feed such energy to the Tx antenna 23 with which it is associated. Thus, for the Tx antennas along a length of a Tx cable segment, the attenuation of the radio frequency energy fed to the antennas will progressively decrease in a direction away from the end of the Tx cable segment to which the radio frequency signals from the combiner 17 are fed. With a suitable selection of coupling values for the taps, each of the Tx antennas 23 connected to an individual Tx cable segment will receive and radiate approximately the same amounts of radio frequency energy. The Tx signal boosters 24, which compensate for the attenuation in the Tx cable system will boost the signal from segment to segment so that all of the antennas along the entire length of the Tx cable system will receive and radiate approximately the same amount of radio frequency energy. With the input power to each Tx antenna being adjusted to only the amount required, the power in the system is thus conserved and the system cost is minimized.

Likewise, the taps 21 which couple the Rx antennas to the Rx cable system will feed a preselected amount of radio frequency energy from each of the Rx antennas 28 to the Rx cable segment to which they are attached, with the amount of energy fed from an antenna to the Rx cable segment progressively decreasing in a direction towards the radio receiver end of the Rx cable system 31. Thus, with a suitable selection of the amount of coupling of each signal tap, the total attenuation of the Rx signal from any of the Rx antennas to the receiver end of the Rx cable segments to which they are attached will be approximately the same. The Rx signal boosters 36 which compensate for attenuation in the Rx cable will boost the Rx signals received from the Rx antennas from segment to segment so the the total attenuation from each Rx antenna along the entire length of the Rx cable system 31 to the receiver end of the Rx cable system will be approximately the same.

Flexible coaxial cable can be readily pulled through cable ducts, conduits or crawl spaces, generically indicated on FIG. 2 by the reference numeral 38. Since the cable itself does not radiate or receive radio signals, the performance of the distributed antenna system is not affected by the proximity of the cable to metal or concrete surfaces. As a consequence, the Tx and Rx cable system 18 and 31 can be enclosed in conduit or concrete ducts 38 near the floor of the subway where the temperatures will be lowest during a fire. Likewise, the cables will be protected against physical damage from moving objects in the subway.

Due to the greater cost of leaky coaxial cable and installation cost, a distributed antenna system using low loss CATV cable can be installed for approximately one-third the cost of an antenna system using leaky coaxial cable. The money saved would pay for much of the cost of protecting the Tx and Rx cable system in conduit.

As is shown in FIG. 1, the Rx and Tx antennas are staggered, with the Rx antennas 28 being located preferably midway between the Tx antennas 23. This will afford approximately 70 dB of space isolation between the receiving and transmitting antennas, and it has been found that spurious or intermodulation signals generated in the transmitting amplifiers is greatly attenuated and has little interference with the desired signals received by the Rx antennas 28 from a transceiver 26.

By using wide band (100 to 1,000 mHz) linear amplifiers, the system will accommodate VHF (150 mHz band), UHF (450–512 mHz band) and 800–900 mHz radio channels. Thus, the communications needs for police, fire, emergency medical services can easily be accommodated in addition to the needs of the transmit system itself.

FIG. 3 shows a tool 41 which may be used to position and drill holes in the vinyl jacket 42 and/or outer conductor shield 43 of the Tx and Rx cables 18 and 31 so that a tap 21 may be connected to the cable. The tool 41 comprises upper and lower clamp members 44 and 46, each having a semi-cylindrical inner surface, which grip the cable when the attached pliers handles 47 are squeezed and locked by the U-shaped bail 48. The upper clamp member 44 has a hole 49 to guide a flat faced twist drill 51 for drilling through the vinyl jacket 42, the outer conductor shield 43 and dielectric 52 to expose the center metal conductor 53 of the cable. The upper clamp member 44 has a second guide hole 54 with internal threads for threaded reception of the coring tool 56. The coring tool 56 has saw teeth 57 on its bottom face for cutting a small disk from the vinyl jacket 42 to expose the outer conductor 43, and a collar 58 engagable with the upper surface clamp member 44 to prevent the coring tool from cutting the outer conductor. Likewise, the drill 51 has a collar 59 to prevent the drill from cutting the center conductor 53 of the cable. After the holes have been drilled, the tool 41 is removed, leaving the cable 18 with spaced apart holes 61 and 62, hole 61 exposing the center conductor 53 and hole 62 exposing the outer conductor shield 43.

Figure 6:
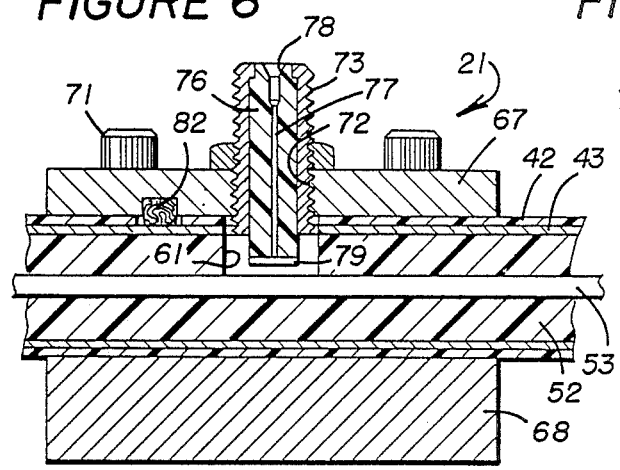
FIG. 6 is a sectional view of the signal tap of FIG. 5, taken on lines 6—6 thereof.
Figure 7:
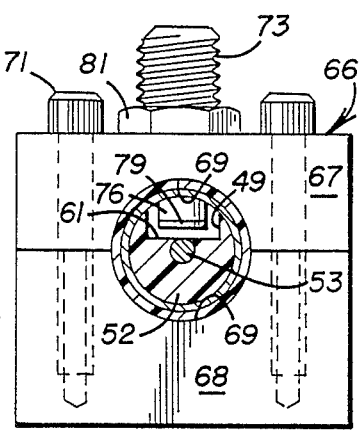
FIG. 7 is an end view of the signal tap of FIG. 6, with a portion of the coaxial cable dielectric removed to show the bottom of the signal tap.

FIGS. 5–7 illustrate one embodiment of a signal tap 21 constructed in accordance with the present invention. Signal tap 21 includes a clamp 66 having upper and lower parts 67 and 68, each with a inner semi-cylindrical surface 69 complementary to, and surrounding the outer surface of cable 18. The clamp parts are held in gripping relationship to cable 18 by machine screws 71. Prior to fitting the clamp 66 onto the cable 18, silicon grease, or the like, should be applied to the vinyl jacket 42 surrounding the holes 61 and 62 to seal out moisture after the tap has been installed.

The upper clamp part 67 has an internally threaded hole 72 aligned with the cable hole 61, to receive externally threaded tube 73. The threaded tube 73 encloses an insulator 76 surrounding a center metal wire conductor 77 connected at its upper end to receptacle 78 and at its lower end to metal disk 79. When the threaded tube 73 is turned relative to the upper clamp part 67, the disk 79 and center conductor 53 of the cable constitute a variable capacitor for adjusting the amount of radio frequency energy extracted from, or coupled to, the cable. Lock nut 81 secures the threaded tube 73 in adjusted position. The upper clamp part 73 is connected to the outer shield 43 by a compliant woven metal contact 82 which penetrates through hole 62 cut in the vinyl jacket 42 of the cable. The woven contact 82 is preferably secured to the upper clamp part 67 with adhesive cement in a shallow hole in the clamp part.

The transmission lines 22 or 29 to and from the Tx and Rx antennas 23 and 28 are fitted with CATV type F connectors (not shown) that mate with receptacle 78 and the external threads on tube 73.

The input power at UHF and higher frequencies to each transmitting antenna 23 is established by adjusting the threaded tube 73 clockwise to increase the power coupled to or from the antenna and counterclockwise to decrease it. The output from a signal generator and power amplifier is adjusted to the normal operating frequency and power level and is fed into the Tx cable 18. The signal taps 21 on the Tx cable are then adjusted so that 0.0 dBm (1.0 mW) power is measured at the output of each tap, i.e., at the input to the Tx antenna lines 22. The same procedure is used to adjust the signal taps 21 which couple the Rx antennas to the Rx cable 31.

The capacitively coupled signal tap 21 of FIGS. 5–7 provides an adequate adjustment range for UHF (450 mHz) and higher frequencies, but the adjustment range is inadequate when the signal level on cable 18 has been attenuated to less than 20 dBm. This is because the capacitive reactance between the disk 79 and center conductor 53 increases as the frequency is decreased, causing the attenuation in the tap at VHF frequencies to be greater than it is at UHF frequencies.

Figure 8:
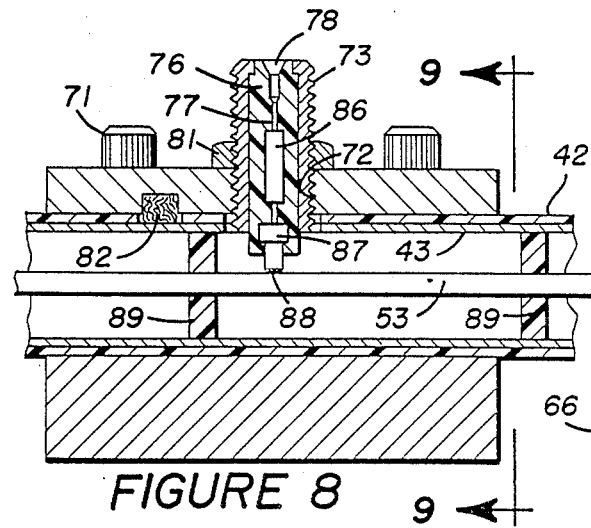
FIG. 8 is a sectional view of an alternate form of a signal tap constructed in accordance with the present invention.
Figure 9:
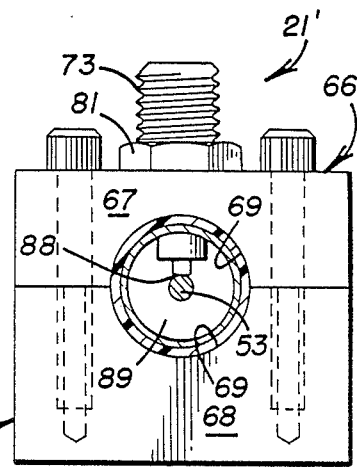
FIG. 9 is an end view of the signal tap of FIG. 8, as seen from line 9—9 thereof.

This problem is solved by the resistance coupled signal tap 21', shown in FIGS. 8 and 9, that is not frequency sensitive and which is interchangeable with the capacitively coupled signal taps 21 previously described. A signal tap 21' to feed each Tx antenna with an equal amount of power, or to receive from each Rx antenna a different amount of power, would be selected from an assortment of signal taps 21' having different values of tap attenuation.

The resistance coupled tap 21' differs from the capacitively coupled tap 21 in that the lower end of the center wire conductor 77 is connected through resistor 86 to one side of capacitor 87. The protruding metal end 88 of capacitor 87 is serrated or roughened so as to clean the center conductor 53 of the cable and make a good electrical connection therewith.

The function of the capacitor 87 is to isolate 60 Hz power (used to power the booster amplifiers 24 and 36) multiplexed on the cables 18 and 31 from the antennas 23 and 28. The reactance of the capacitor 87 is selected so as not to cause any appreciable attenuation of the lowest radio frequencies used in the system. The attenuation of the taps is determined by the ohmic resistance of resistor 86. Typical tap attenuation values are 8, 10, 12, 14, 16 and 18 and 20 dB, thereby providing a choice of preselected attenuation values for adjusting the amount of radio frequency energy coupled to and from the Tx and Rx antennas.

Figure 10:
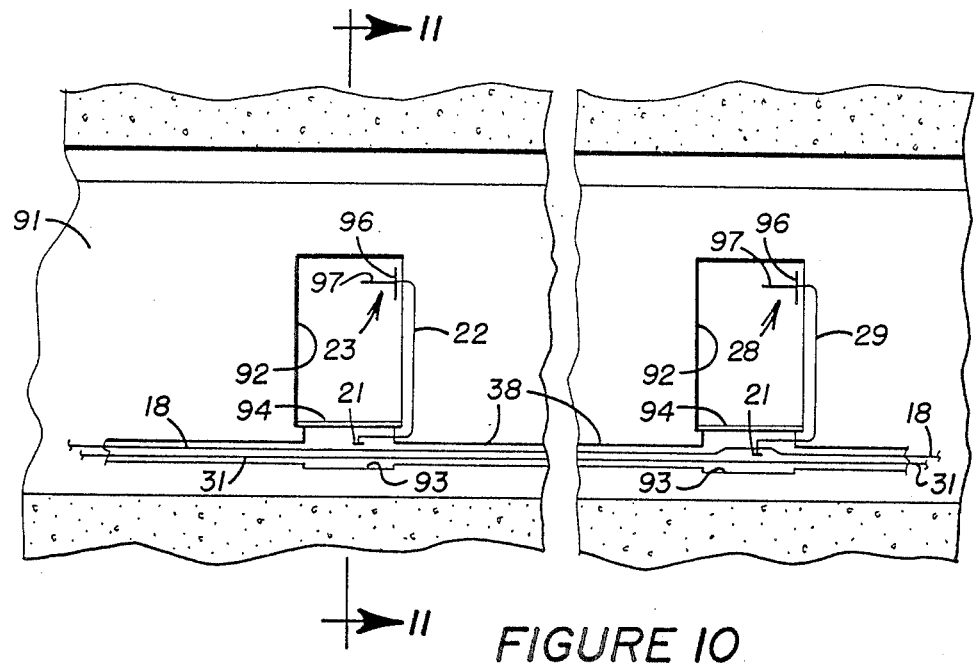
FIG. 10 is a diagrammatic cross-section of a subway with two parallel tunnels and of a distributed antenna system in accordance with the present invention which is installed in the subway.
Figure 11:
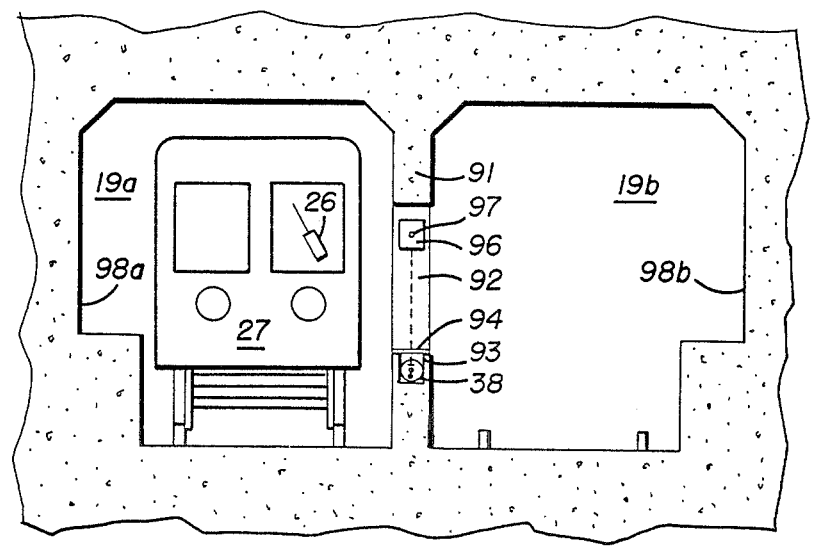
FIG. 11 is a cross-section of the subway and distributed antennas system of FIG. 10, showing a train in the subway.

FIGS. 10 and 11 illustrate a subway system having parallel tunnels 19a and 19b for the inbound and outbound subway trains 27, separated by a common wall 91. A plurality of portals 92 through the common wall 91, at intervals of approximately 100 feet (or as needed), interconnect tunnels 19a and 19b. A pull box 93, with removable access plate 94, is located at each portal 92 to provide access to the Tx and Rx cable systems 18 and 31 which extend through the cable ducts 38. The staggered Tx and Rx antennas 23 and 28 will be disposed in the portals 92, with the Tx antennas 23 being connected by transmission lines 22 and signal taps 21 to the Tx cable system 18, and with the Rx antennas 28 being connected by transmission lines 29 and signal taps 21 to the Rx cable system 31.

The Tx and Rx antennas 23 and 28 may each comprise an 18-inch square aluminum ground plane 96 and an 18-inch whip antenna 97 mounted thereon. Radiation from a Tx antenna 23 will illuminate the opposite walls 98a and 98b of tunnels 19a and 19b and will be reflected and propagated in both directions in both tunnels. Conversely, a Rx antenna 28 will receive signals propagated along either or both tunnels from subway train transceiver 26.

The use of the same transmitting antenna 23 and receiving antennas 28 to serve both subway tunnels reduces the installation cost by half. Further, reliability of the system will be greatly enhanced since there is only one half as much equipment to be maintained.

The foregoing description of the preferred embodiments has been presented for the purposes of illustration and description. It is not intended to be exhaustive or to limit the invention to the precise features described, and obviously many modifications and variations are possible in light of the above teaching. As for example, either of the taps 21 or 21' can be used with coaxial cables having a cellular dielectric 52, as shown in FIGS. 6 and 7, or with coaxial cables having an air dielectric with the center conductor 53 supported by spaced apart plastic disks 89, as shown in FIGS. 8 and 9. The embodiments were shown in order to explain most clearly the principles of the invention and the practical applications thereby to enable others in the art to utilize most effectively the invention in various other modifications as may be suited to the particular use contemplated. It is intended that the scope of the invention be defined by the claims appended hereto.

I claim:

1. A system for providing radio communication to and from a transceiver in a confined region into which external radio signals do not penetrate, said system comprising:
   (a) first and second elongated low loss coaxial cable segments in said region,
   (b) means for applying radio frequency signals to one end of said first cable segment,
   (c) a plurality of transmitting antennas proximate to said first cable segment at spaced intervals therealong,
   (d) a plurality of signal tap means coupling each of said transmitting antennas to said first cable segment, each tap means having the function of extracting a preselected amount of radio frequency energy from said first cable segment and for feeding such preselected amount of energy to the transmitting antenna with which it is associated so that the energy radiated from each transmitting antenna is approximately the same,
   (e) a plurality of receiving antennas proximate to said second cable segment at spaced intervals therealong,
   (f) means for receiving radio frequency signals from one end of said second cable segment,
   (g) a plurality of signal tap means coupling each of said receiving antennas to said second cable segment, each tap means having the function of feeding a preselected amount of radio frequency energy to said second cable segment from the receiving antenna with which it is associated so that the total attenuation of signals received by each of said receiving antennas from said antennas to said one end of said second cable segment is approximately the same.

2. A system as set forth in claim 1, wherein said receiving antennas are spaced along said second cable segment in staggered relation to said transmitting antennas whereby spurious or intermodulation signals transmitted by the transmitting antennas are substantially attenuated by the space attenuation between the transmitting and receiving antennas.

3. A system as set forth in claim 1, and further including:
   (h) a further elongated low loss coaxial cable segment in said region,
   (i) a radio frequency signal booster connected between said first cable segment and said further cable segment,
   (j) a further plurality of transmitting antennas proximate to said other cable segment at spaced intervals therealong,
   (k) a further plurality of signal tap means coupling each of said further plurality of transmitting antennas to said further cable segment, each of said further plurality of tap means having the function of extracting a preselected amount of radio frequency energy from said further cable segment and for feeding such preselected amount of energy to the transmitting antenna with which it is associated so that the energy radiating from each of said further transmitting antennas in approximately the same.

4. A system as set forth in claim 1, and further including protective ducting extending through said region, said first and second cable segments being disposed in said ducting and said transmitting and receiving antennas being located in said region and externally of said ducting.

5. A system as set forth in claim 4, wherein said receiving antennas are spaced along said second cable segment in staggered relation to said transmitting antennas whereby spurious or intermodulation signals transmitted by the transmitting antennas are substantially attenuated by the space attenuation between the transmitting and receiving antennas.

6. A system as set forth in claim 1, wherein the said confined region comprises parallel tunnels with a common wall therebetween and a plurality of portals through said common wall at intervals along said tunnels to interconnect said tunnels, wherein each of said transmitting antennas is mounted in a different one of said portals for propagating radio frequency signals in both directions along both of said tunnels, and wherein each of said receiving antennas is mounted in other and different of said portals for reception of radio frequency signals propagated along either of said tunnels.

7. A system as set forth in claim 6, wherein said receiving antennas are spaced along said second cable segment in staggered relation to said transmitting antennas whereby spurious or intermodulation signals transmitted by the transmitting antennas are substantially attenuated by the space attenuation between the transmitting and receiving antennas.

8. A system as set forth in claim 1, wherein said coaxial cables each have an outer metallic shield and a center metal conductor, wherein at least one of said cable segments has a hole extending through said outer metallic shield and exposing said center conductor, and wherein at least one of said signal tap means includes a metal clamp surrounding and gripping the cable segment with which it is associated, said clamp having a threaded hole adjacent said hole in said cable.

9. A system as set forth in claim 8, wherein said at least on signal tap means further includes a threaded metal tube and a center metal conductor and a coaxial cable connector at one end thereof, said metal tube being threadably inserted in said threaded hole of said clamp, said center metal conductor of said tap means having a metal disk adjacent said center conductor of said cable segment, said disk and center conductor of said cable segment, forming a capacitor whose capacitance can be varied by threaded adjustment of said metal tube in said threaded hole of said clamp to adjust the spacing between said disk and center conductor of said cable to thereby adjust the amount of radio frequency energy coupled from one center conductor to the other.

10. A system as set forth in claim 8, wherein said at least one signal tap means includes a threaded metal tube threaded into said threaded hole in said clamp, a coaxial cable connector at one end of said tube, and a series-connected resistor and capacitor connected between and to said coaxial cable segment connector of said tap means and said center conductor of said cable segment, said capacitor having a low impedance to radio frequencies and said resistor having a selected value of resistance to enable a selected amount of radio frequency energy to be coupled to or from said cable.

11. A signal tap for use with a coaxial cable having an outer metallic shield and a center metal conductor, said cable having a hole extending through said metallic shield and exposing said center conductor, said signal tap comprising:
   a metal clamp having a threaded hole therethrough, said clamp being adapted to surround and grip said cable with the threaded hole in said clamp being adjacent said hole in said cable,
   a threaded metal tube threadably receivable in said clamp hole,
   a coaxial connector at one end of said tube,
   a series-connected resistor and capacitor in said metal tube with one end thereof connected to said coaxial connector, said capacitor having a low impedance to radio frequencies and said resistor having a selected value of resistance to enable a selected amount of radio frequency energy to be coupled to or from said coaxial cable,
   means on the other end of said series-connected resistor and capacitor for electrically engaging said center conductor of said cable when said clamp surrounds and grips said cable and said threaded tube is threaded into said hole of said clamp.

12. A signal tap as set forth in claim 11, wherein said cable has an insulated jacket and an opening through said jacket to expose said metallic shield, said signal tap further including a metal contact secured thereto and adapted to extend through said opening in said jacket and electrically engage said metallic shield when said clamp surrounds and grips said cable with the threaded hole in said clamp being adjacent said hole in said cable.

13. A system as set forth in claim 3, wherein said radio frequency signal booster has the function of compensating for attenuation in said first cable segment so that the amount of energy transmitted from each of said further transmitting antennas is approximately the same as that transmitted from each of said transmitting antennas coupled to said first cable segment.

* * * * *

UNITED STATES PATENT AND TRADEMARK OFFICE
CERTIFICATE OF CORRECTION

PATENT NO. : 4,972,505
DATED : November 20, 1990
INVENTOR(S) : Reuben A. Isberg

It is certified that error appears in the above-identified patent and that said Letters Patent is hereby corrected as shown below:

In the title of the invention, change "top" to --taps--, so that the title reads:

> TUNNEL DISTRIBUTED CABLE ANTENNA SYSTEM
> WITH SIGNAL TAPS COUPLING APPROXIMATELY
> SAME RADIATED ENERGY

Signed and Sealed this

Twelfth Day of May, 1992

*Attest:*

DOUGLAS B. COMER

*Attesting Officer*     *Acting Commissioner of Patents and Trademarks*